April 17, 1951  J. M. CONSTABLE  2,549,058
PORTABLE RADIATION DETECTOR
Filed Jan. 7, 1949
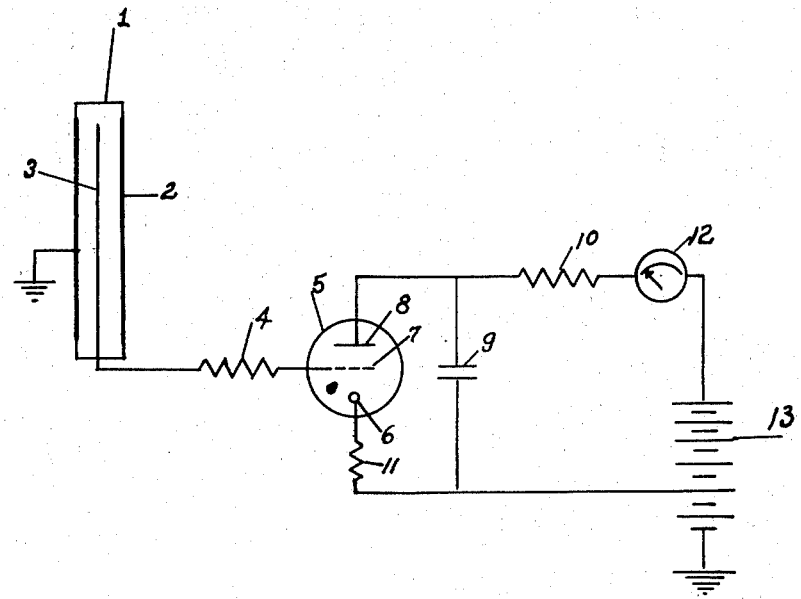
INVENTOR.
JAMES M. CONSTABLE
BY
AGENT Patented Apr. 17, 1951

2,549,058

UNITED STATES PATENT OFFICE 2,549,058

PORTABLE RADIATION DETECTOR

James M. Constable, Ozone Park, N. Y.

Application January 7, 1949, Serial No. 69,651

8 Claims. (Cl. 250—83.6)

My invention relates to portable devices for detecting penetrating radiation. In a more specific sense, it is directed to detection apparatus or equipment employing Geiger-Müller tubes and adapted to be operated with self-contained sources of power.

In portable apparatus in general, the primary considerations are that it be compact, light in weight, small in size, and if operated by a source of power, that the power consumption be as small as possible. For apparatus employed to detect radioactive emanations and the like, the additional requirement is imposed that the equipment be sufficiently sensitive to detect relatively weak radiation. These requirements impose severe limitations on the design of this type of apparatus and the result generally is that such equipment represents a compromise between all of these factors.

Present types of portable detectors of radioactive emanations represent a highly efficient design compromise of the several factors. Amplifier stages have been kept to a minimum and discharge tubes having a low power consumption have been developed which have aided in reducing power consumption to a minimum. However, it is still necessary to provide battery power for filaments of these tubes which necessarily increases the weight of the apparatus as well as introducing the disadvantage of having to have replacement units to replace batteries which are rapidly exhausted.

It is an object of my invention to provide a portable detector of penetrating radiation embodying a new principle of operation which is extremely compact, light in weight, and highly efficient.

It is a further object of my invention to reduce the power requirements in portable detectors of penetrating radiation thus eliminating a major source of extra weight.

It is a still further object of my invention to provide a simplified construction of a portable detector of penetrating radiation which is rugged and will have a prolonged battery life.

It is another object of my invention to provide a portable detector of penetrating radiation which is simple to assemble, requires a minimum of components, and has short resolving time enabling it to count incoming pulses of radiation occurring at a rapid rate.

These and further objects of my invention will appear as the specification progresses and in connection with the appended drawing forming a part of this specification.

In accordance with my invention, a Geiger-Müller tube which may be placed conveniently in a probe to facilitate detection of hidden sources of radioactive emanations is coupled to the input of a gaseous discharge tube in such manner that the Geiger-Müller tube is energized through the gaseous medium of the tube, and the pulse generated by the Geiger-Müller tube when a pulse of radioactive radiation enters the tube is amplified by the gaseous discharge tube. With a single stage of amplification supplied by the gaseous discharge tube, the output of the latter is sufficient to operate an indicating device thus giving visual or aural indication of the presence of possibly harmful and dangerous radiation.

In the preferred embodiment of the invention, I have found it preferable in fulfilling the above objects, to employ gaseous discharge tubes of the "cold" type. These tubes operate with no heated cathodes, conduction taking place solely through the mechanism of the gas. Above certain well-defined ionizing potentials, the gas in the tube becomes sufficiently ionized to form a conduction path through the tube. In other words, the discharge does not depend upon a heated cathode to emit electrons thereby rendering the tube conducting.

In the operation of these type tubes a certain voltage is usually applied between the anode and the cathode which is insufficient to cause a "breakdown" of such tube with attendant current flow. A similar but much lower voltage is customarily applied between the control electrode and the cathode. Upon a slight increase in the latter the gas within the tube becomes ionized and a discharge occurs between the control electrode and the cathode. Since ionization is substantially instantaneous the resistance of the tube is thus immediately reduced so that the insufficient voltage previously applied between the anode and cathode then is sufficient to cause a sustaining discharge with current flow in the cathode-anode circuit so long as such voltage remains above the sustaining voltage. So far as the control electrode is concerned it plays no part in the operation of the tube once it has caused the initiation of the discharge between anode and cathode and so long as the latter is sustained.

In order that the invention may be more clearly understood and carried into effect, it will now be described with reference to the accompanying drawing in which the sole figure shows a preferred embodiment of the circuit arrangement of the portable detector of penetrating radiation according to the invention.

Referring to the drawing, a Geiger-Müller tube 1 which may be placed in a probe or in a housing has its cathode cylinder 2 grounded and the anode wire 3 coupled through a resistor 4 to the control electrode of a cold gaseous discharge tube 5. The cathode 6 of the tube is connected through a cathode resistor 11 to a battery 13 while the anode electrode 8 is connected through a resistor 10 to an indicating instrument 12 to the positive terminal of the battery. The negative terminal of the battery is grounded to complete the circuit for the Geiger-Müller tube. Shunting tube 5 between the anode and the cathode is a capacitor 9.

It will thus be seen that the gaseous discharge tube 5 has an input circuit comprising the lower portion of the battery 13 to ground, thence to Geiger-Müller tube 1, through resistor 4 to control electrode 7, and from cathode 6 through resistor 11 back to a tap on battery 13. The output circuit for tube 5 includes resistor 10, meter 12 to battery 13 and thence back to cathode 6 through the resistor 11 with condenser 9 being shunted across such output circuit as above mentioned.

The apparatus of the present invention operates in the following manner. When the apparatus is initially connected to the source of power, shown as battery 13, by a switch or the like (not shown) the voltage is at that moment sufficient to cause a momentary discharge to occur between the cathode 6 and the control electrode 7 since the relatively high voltage of the lower portion of battery 13 is applied to the electrodes 2 and 3 of the Geiger-Müller tube 1 through the gaseous medium between the electrodes 6 and 7 of tube 5. In this instance the Geiger-Müller tube 1 acts as a capacitor and the capacity existing between the electrodes 2 and 3 will become charged to the voltage of the lower portion of battery 13 less the sustaining voltage of the gaseous medium between the electrodes 6 and 7 of tube 5. Once this has occurred and the Geiger-Müller tube "charged" such momentary discharge will become extinguished. Thus the voltage of the lower section of battery 13 should be equal to the desired operating voltage of Geiger-Müller tube 1 plus the sustaining voltage of the gaseous medium between electrodes 6 and 7 of tube 5. The voltage of the upper portion of battery 13 will be applied across the anode 8 and cathode 6 of tube 5. By way of example, it may be assumed that such voltage is 250 volts while the desired Geiger-Müller tube operating voltage is 700 volts. Then since the sustaining voltage between the electrodes 6 and 7 of tube 5 is approximately 60 volts, the voltage of the lower portion of battery 13 should be approximately 760 volts. The voltage necessary to initiate the discharge between the control electrode 7 and the cathode 6 is approximately 70 volts. For the initial "charging" of the Geiger-Müller tube there is 760 volts available to do this. Now, having the desired operating voltage applied to the Geiger-Müller tube 1 through the gaseous medium of the control electrode-cathode path in tube 5, when an ionizing event causes a discharge in the Geiger-Müller tube thus reducing the voltage across its electrodes, a gas path will be established between the control and cathode electrodes of tube 5 to "recharge" the Geiger-Müller tube. Thus every time an ionizing event occurs in the Geiger-Müller tube a gas path will be established in the gaseous discharge tube 5.

It will also be noted that since condenser 9 is shunted across the output circuit of tube 5 it likewise will be charged to the same voltage applied across cathode 6 and anode 8, or in the assumed example, 250 volts. Now, when the tube becomes ionized due to the initiating discharge in the Geiger-Müller tube the condenser 9 will be discharged through the tube 5 via electrodes 8 and 6. This discharge is very rapid and continues until the voltage across the tube 5 drops to just below the arc sustaining voltage of tube 5. If the full voltage were immediately re-applied across the anode 8 and the cathode 6, the tube 5 would continue to conduct current due to its residual ionization, however, the resistor 10 and the condenser 9 have such values that the series combination has such a time constant that the re-application of voltage to the tube 5 is gradual enough that the tube remains in a non-conducting state until it receives another initiating impulse on its control-cathode electrodes from the Geiger-Müller tube. The meter 12 being in series with the condenser 9 and the battery 13 indicates the charging current of the condenser 9 and therefore the average reading of the meter will be a function of the number of times per unit time that the condenser 9 is charged or, in other words, the meter will indicate the rate of discharges in the Geiger-Müller tube, and thus be an indication of the intensity of radiation entering the Geiger-Müller tube.

The deionization time of the tube is a function of the current flowing through the tube. Since the current pulses initiated in the Geiger-Müller tube are of relatively short duration, the deionization time of the gaseous discharge tube is therefore dependent both upon the length of time and the magnitude of the current flowing through the gaseous discharge tube. The deionization time of the gaseous discharge tube is therefore a function of the value of capacitor 9. The time constant of resistor 10 and capacitor 9 is adjusted to be somewhat longer than the deionization time of the tube. For a typical tube of this type, resistor 10 having a value of 2.5 megohms and capacitor 9 having a value of 75 $\mu f.$ gives a deionization time of approximately one-tenth millisecond.

One important advantage of this circuit is that the output of this circuit is dependent upon the circuit constants and not upon the value of the initiating impulse.

In describing my invention, I have described a preferred embodiment only and while I am aware that various modifications of the basic circuit are possible, I do not wish to be limited solely to that circuit arrangement which I have described but wish the invention defined in the appended claims to be construed as broadly as permissible in view of the prior art.

What I claim is:

1. A device for detecting penetrating radiation comprising means to convert the radiation into electrical impulses, a gaseous discharge device having input and output means, energizing means connected to said gaseous discharge device, coupling means connecting said radiation converting means to said input means, means to energize said radiation converting means through said gaseous discharge device, and means connected to said output means and operable to indicate the radiation upon the occurrence of an electrical impulse in said radiation converting means which is automatically impressed on said gaseous discharge device by said coupling means and said input means.

2. A device for detecting penetrating radiation comprising means to convert the radiation to electrical impulses including a pair of electrodes within a container and an ionizable gaseous medium therebetween, a gaseous discharge device having input and output means, energizing means connected to said gaseous discharge device, coupling means connecting one electrode of said radiation converting means to said input means, means to apply a potential between the electrodes of said radiation converting means through said gaseous discharge device and including said coupling means and said input means, and means connected to said output means and operable to indicate the radiation upon the occurrence of an electrical impulse in said radiation converting means which impulse is automatically impressed on said gaseous discharge device by said coupling means and said input means.

3. A device for detecting penetrating radiation comprising means to convert the radiation to electrical impulses including a pair of electrodes within a container and an ionizable medium therebetween, a gaseous discharge device having a control electrode, energizing means for said gaseous discharge device comprising a source of potential and deionizing means in series with said source and said gaseous discharge device, coupling means connecting one electrode of said radiation converting means to the control electrode of said gaseous discharge device, means to energize said radiation converting means through said gaseous discharge device including said coupling means, and means connected to said gaseous discharge device and operable to indicate the radiation upon the occurrence of an electrical impulse in said radiation converting means which impulse is automatically impressed on the control electrode of said gaseous discharge device by said coupling means.

4. A device for detecting penetrating radiation comprising means to convert the radiation to electrical impulses, a cold gaseous discharge tube, input means and output means for said cold gaseous discharge tube, energizing means connected to said cold gaseous discharge tube, coupling means connecting said radiation converting means to said input means, means to energize said radiation converting means through said cold gaseous discharge tube and including said input means and said coupling means, and means connected to said output means and operable to indicate the radiation upon the occurrence of an electrical impulse in said radiation converting means which impulse is automatically impressed on said cold gaseous discharge tube by said coupling means and said input means.

5. A device for detecting penetrating radiation comprising means to convert the radiation to electrical impulses, a cold gaseous discharge tube having a control electrode, coupling means connecting said radiation converting means to the control electrode of said cold gaseous discharge tube, energizing means connected to said cold gaseous discharge tube, means to energize said radiation converting means through said cold gaseous discharge tube including said coupling means and said control electrode, and means connected to said cold gaseous discharge tube and operable to indicate the radiation upon the occurrence of an electrical impulse in said radiation converting means which impulse is automatically impressed on said cold gaseous discharge tube by said coupling means and said control electrode.

6. A device for detecting penetrating radiation comprising means to convert the radiation into electrical impulses, a cold gaseous discharge tube having a cathode electrode, a control electrode and a collector electrode; energizing means for applying an ionizing potential to the collector electrode of said cold gaseous discharge tube, coupling means connecting said radiation converting means to the control electrode of said cold gaseous discharge tube, means to energize said radiation converting means through said cold gaseous discharge device including the cathode and control electrode of said cold gaseous discharge tube and said coupling means, and means connected to the collector electrode of said cold gaseous discharge tube and operable to indicate the radiation upon the occurrence of an electrical impulse in said radiation converting means which impulse is automatically impressed on said cold gaseous discharge tube by its control electrode and said coupling means.

7. A device for detecting penetrating radiation comprising means to convert the radiation to electrical impulses including a pair of electrodes within a container and an ionizable medium therebetween, a cold gaseous discharge tube having cathode, control and collector electrodes; energizing means for applying an ionizing potential to the collector electrode of said cold gaseous discharge tube, coupling means connecting one of the electrodes of said radiation converting means to the control electrode of said cold gaseous discharge tube, means for applying a potential between the electrodes of said radiation converting means through said cold gaseous discharge tube including the cathode and control electrodes thereof, and means connected to the collector electrode of said cold gaseous discharge tube and operable to indicate the radiation upon the occurrence of an electrical impulse in said radiation converting means which impulse is automatically impressed on said cold gaseous discharge tube by its control electrode and said coupling means.

8. A device for detecting penetrating radiation comprising means to convert the radiation into electrical impulses including a pair of electrodes within a container and an ionizable medium therebetween, a cold gaseous discharge tube having cathode, control and collector electrodes; energizing means for applying an ionizing potential to the collector electrode of said cold gaseous discharge tube comprising a source of potential to ionize said cold gaseous discharge tube and including deionizing means connected in the said source of potential and said cold gaseous discharge tube, coupling means connecting said radiation converting means to the control electrode of said cold gaseous discharge tube, means for applying a potential between the electrodes of said radiation converting means through said cold gaseous discharge tube including the cathode and control electrodes thereof, and means connected to the collector electrode of said cold gaseous discharge tube and operable to indicate the radiation upon the occurrence of an electrical impulse in said radiation converting means which impulse is automatically impressed on said cold gaseous discharge tube by its control electrode and said coupling means.

JAMES M. CONSTABLE.

(References on following page)

REFERENCES CITED

The following references are of record in the file of this patent:

UNITED STATES PATENTS

| Number | Name | Date |
|---|---|---|
| 2,122,222 | Vingerhoets | June 28, 1938 |
| 2,191,185 | Wolff | Feb. 20, 1940 |
| 2,288,554 | Smith, Jr. | June 30, 1942 |

OTHER REFERENCES

Gingrich, Review of Scientific Instruments, May, 1936, pp. 207–210.

Korff, Electron and Nuclear Counters, 1946, D. Van Nostrand Co., Inc., New York, pp. 162, 163 and 183.